US010164566B2

United States Patent
Cioffi et al.

(10) Patent No.: US 10,164,566 B2
(45) Date of Patent: Dec. 25, 2018

(54) UNIVERSAL MICROINVERTER MOUNTING BRACKET FOR A PHOTOVOLTAIC PANEL AND ASSOCIATED METHOD

(71) Applicant: General Electric Company, Schenectady, NY (US)

(72) Inventors: Philip Michael Cioffi, Schaghticoke, NY (US); Mohammed Agamy, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 491 days.

(21) Appl. No.: 14/717,195

(22) Filed: May 20, 2015

(65) Prior Publication Data

US 2016/0344335 A1   Nov. 24, 2016

(51) Int. Cl.
*H02S 30/10*   (2014.01)
*H02S 40/32*   (2014.01)

(52) U.S. Cl.
CPC .............. *H02S 30/10* (2014.12); *H02S 40/32* (2014.12)

(58) Field of Classification Search
CPC .......... H02S 30/10; H02S 40/32; H02S 40/34; H02S 20/00; F24J 2002/5275
USPC .................................................. 136/244, 251
See application file for complete search history.

(56) References Cited

U.S. PATENT DOCUMENTS

| | | | |
|---|---|---|---|
| 5,348,258 A * | 9/1994 | Rasmussen | B60S 9/04 248/218.4 |
| 8,371,076 B2 | 2/2013 | Jones et al. | |
| 8,690,110 B2 | 4/2014 | Shmukler et al. | |
| 8,922,972 B2 | 12/2014 | Korman et al. | |
| 2008/0230665 A1* | 9/2008 | Palermo | B60P 7/0815 248/231.71 |
| 2012/0175322 A1* | 7/2012 | Park | F24J 2/5232 211/41.1 |
| 2012/0255596 A1* | 10/2012 | Korman | F24J 2/5207 136/251 |
| 2013/0276867 A1* | 10/2013 | Wildes | H01L 31/0422 136/246 |
| 2014/0102519 A1 | 4/2014 | Rodrigues et al. | |
| 2014/0109953 A1 | 4/2014 | Aulich | |
| 2014/0168927 A1 | 6/2014 | Morris et al. | |
| 2014/0230877 A1 | 8/2014 | Goldberg et al. | |
| 2014/0260001 A1 | 9/2014 | Kiik et al. | |
| 2014/0265573 A1 | 9/2014 | Kreutzman | |
| 2014/0278163 A1 | 9/2014 | Tan et al. | |

\* cited by examiner

*Primary Examiner* — Susan D Leong
*Assistant Examiner* — Dujuan A Horton
(74) *Attorney, Agent, or Firm* — Ziolkowski Patent Solutions Group, SC; Jean K. Testa (57) ABSTRACT

A system and method for a photovoltaic (PV) module is disclosed that includes a microinverter assembly having a housing disposed on an inactive surface of a PV panel and a microinverter disposed within the housing. The PV module also includes a mounting bracket having a central bracket portion coupled to a frame of the PV panel, a first extension portion extending from the central bracket portion and coupled to the housing, a second extension portion extending from the central bracket portion and positioned on the inactive side of the PV panel, and a third extension portion located above the second extension portion and extending from the central bracket portion. At least one of the second and third extension portions is in contact with an inner wall of the frame of the PV panel.

20 Claims, 7 Drawing Sheets

UNIVERSAL MICROINVERTER MOUNTING BRACKET FOR A PHOTOVOLTAIC PANEL AND ASSOCIATED METHOD

BACKGROUND OF THE INVENTION

Embodiments of the invention relate generally to a photovoltaic (PV) system, and more particularly to an improved bracket for mounting a microinverter to a PV panel regardless of the dimensions of the PV panel frame.

Figure 1:
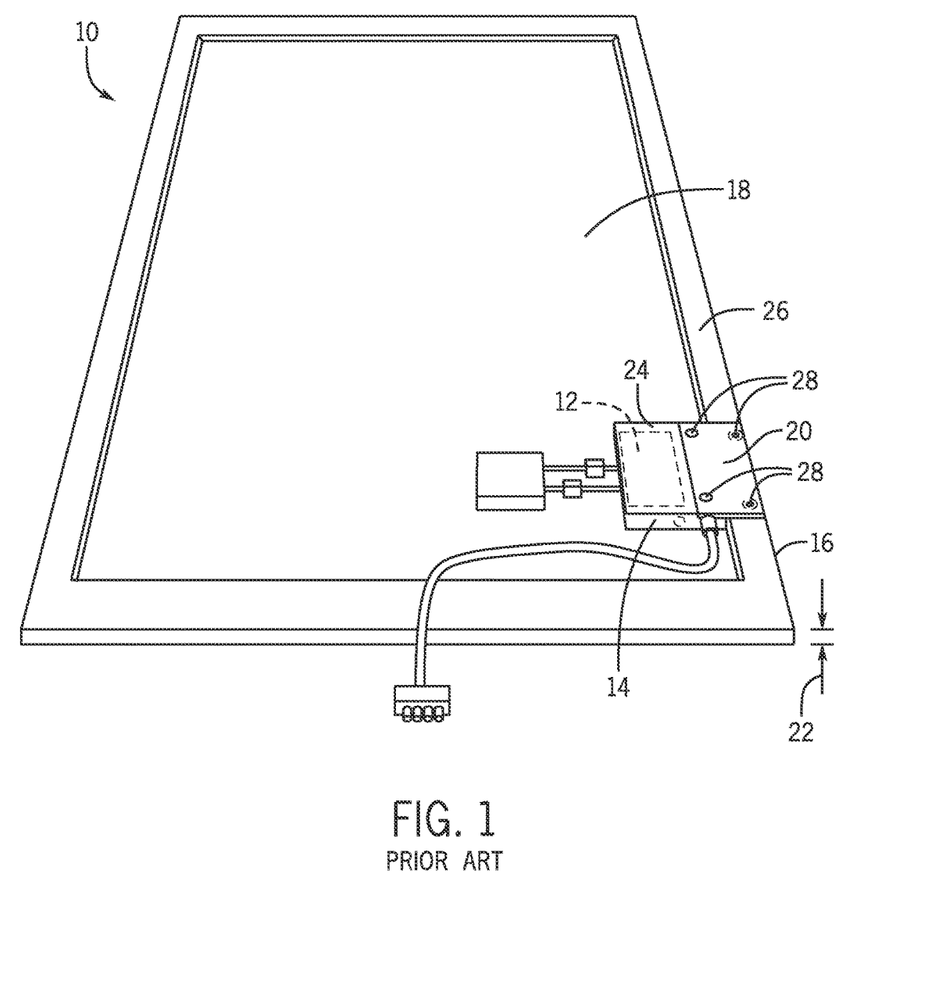
FIG. 1 is a perspective view of the inactive side of a prior art photovoltaic (PV) system.

PV systems include PV modules arranged in arrays that generate direct current (DC) power, with the level of DC current being dependent on solar irradiation and the level of DC voltage dependent on temperature. PV systems may be constructed either as an inverter system or a microinverter system. A typical inverter system uses DC wiring to electrically couple multiple PV panels to a single inverter. The inverter then converts the DC energy from the PV panels into alternating current (AC) energy, such as AC energy suitable for transfer to a power grid. A typical microinverter system, on the other hand, uses a microinverter electrically connected to each PV panel, forming a PV module 10 as shown in FIG. 1. In this PV module system, each microinverter 12 converts the DC energy from its respective PV panel into energy suitable for transfer to a power grid.

In a typical microinverter system the microinverter 12 of a microinverter assembly 14 is secured to the frame 16 of the PV panel 18 via a mounting bracket 20. In the design shown, the thickness 22 of the PV panel frame 16 is selected such that the respective top surfaces 24, 26 of the microinverter 12 and the frame 16, respectively, are co-planar, thereby permitting the mounting bracket to be coupled to the top surface 24 of the microinverter 12 and the top surface 26 of the frame 16 via fasteners 28. In other known designs, the mounting bracket is constructed as part of the housing of the microinverter and extends outward therefrom to couple to the top surface 26 of the frame 16. In either design, the geometry of the PV panel frame 16 is highly dependent upon the geometry of the microinverter.

While these prior art mounting brackets may function to securely fasten a microinverter 12 to the frame 16 of a PV panel 18, the design of these mounting brackets inherently limits the interchangeability of a given microinverter with different panel frame geometries. Since the rectangular mounting bracket extends outward from or is coupled to the top surface of the microinverter, the dimensions of the microinverter and panel bracket is dependent upon the thickness and geometry of the top mating surface of the PV panel frame. As a result, known microinverters and their corresponding mounting brackets are specifically designed to be integrated with a particular panel frame.

Therefore, it would be desirable to provide a universal mounting bracket for a PV system that is designed to allow a given microinverter to be secured to a wide variety of PV panels, regardless of the size and geometry of the frame of the PV panel.

BRIEF DESCRIPTION OF THE INVENTION

In accordance with one aspect of the invention, a photovoltaic (PV) module includes a PV panel having a frame, a microinverter assembly, and a mounting bracket. The microinverter assembly includes a housing disposed on an inactive surface of the PV panel and a microinverter disposed within the housing. In addition, the mounting bracket includes a central bracket portion oriented along a plane and having at least one orifice formed therethrough, wherein the central bracket portion is coupled to the frame of the PV panel, a first extension portion extending from and oriented perpendicular to the central bracket portion and having at least one orifice formed therethrough, wherein the first extension portion is coupled to the housing of the microinverter assembly, a second extension portion extending from and oriented perpendicular to the central bracket portion, wherein the second extension is positioned on the inactive side of the PV panel, and a third extension portion located above the second extension portion and extending from the central bracket portion, wherein at least one of the second extension portion and the third extension portion is in contact with an inner wall of the frame of the PV panel.

In accordance with another aspect of the invention, a method of manufacturing a PV module includes providing a microinverter assembly comprising a housing and a microinverter disposed within the housing, electrically coupling the microinverter to a PV panel, and providing a mounting bracket comprising a central bracket portion oriented along a plane and having an orifice formed therethrough, a first extension portion oriented along a plane perpendicular to the plane of the central bracket portion and having an orifice formed therethrough, a second extension portion oriented along a plane perpendicular to the plane of the central bracket portion, and a third extension portion oriented along a plane perpendicular to the plane of the central bracket portion. Further, the method includes positioning the second extension portion in contact with an inactive side of the PV panel, positioning at least one of the second and third extension portions of the mounting bracket in contact with an inner wall of a frame of the PV panel to create a spacing between the central bracket portion of the mounting bracket and the frame of the PV panel, mechanically coupling the first extension portion of the mounting bracket to the microinverter assembly, and mechanically coupling the central bracket portion of the mounting bracket to the frame of the PV panel.

In accordance with yet another aspect of the invention, a system for securing a microinverter to a PV panel includes a microinverter mounting bracket having a central bracket portion oriented along a plane, the central bracket portion having at least one orifice formed through a thickness defined between a first surface and a second surface of the central bracket portion, a first extension portion extending outward from a top surface of the central bracket portion and away from the first surface of the central bracket portion the first extension portion having at least one orifice formed therethrough, a second extension portion extending outward from a bottom surface of the central bracket portion and away from the second surface of the central bracket portion, and a third extension portion positioned above the second extension portion and extending outward from the second surface of the central bracket portion.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Figure 2:
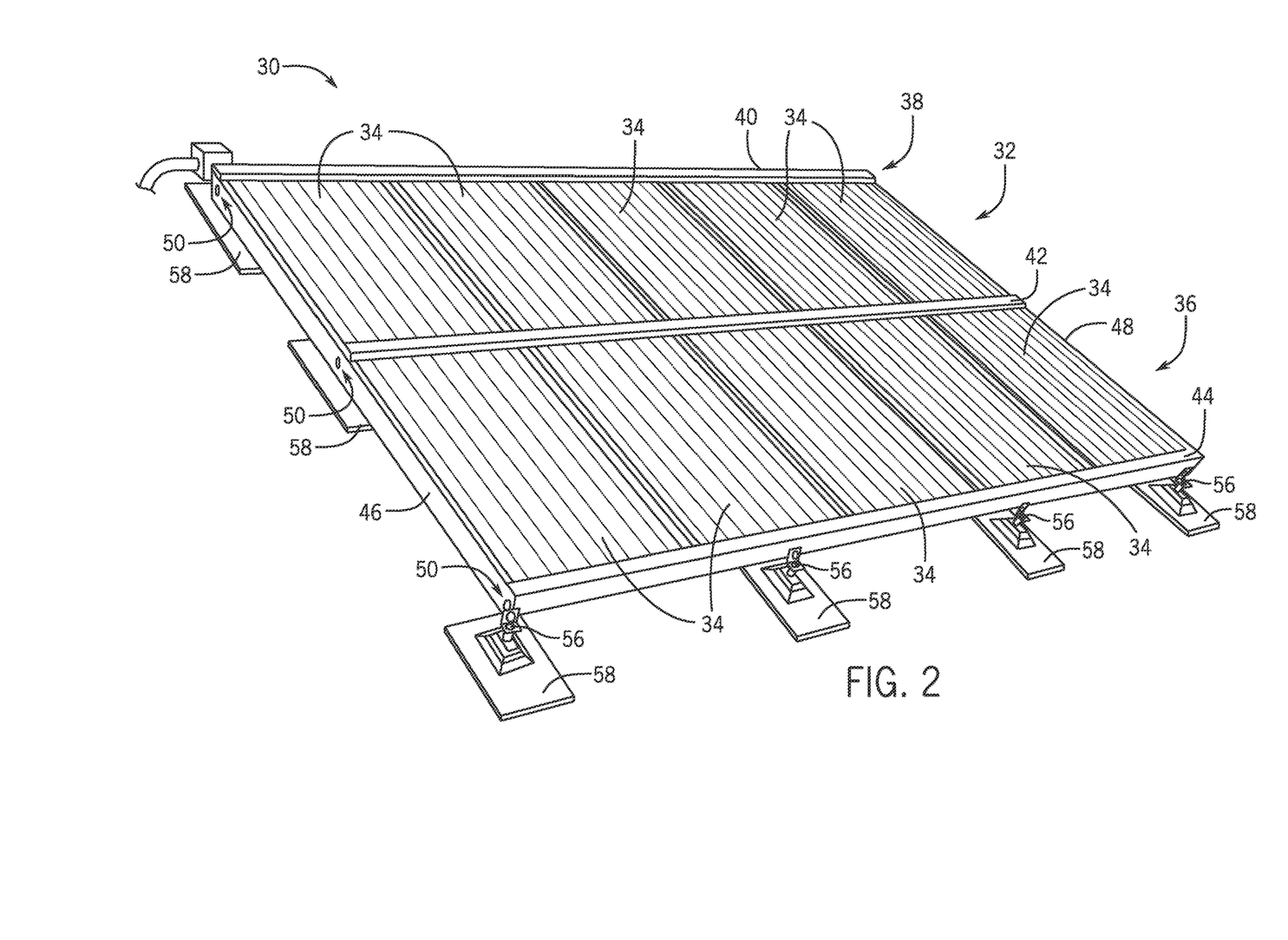
FIG. 2 is a front perspective view of a PV system, according to an embodiment of the invention.
Figure 3:
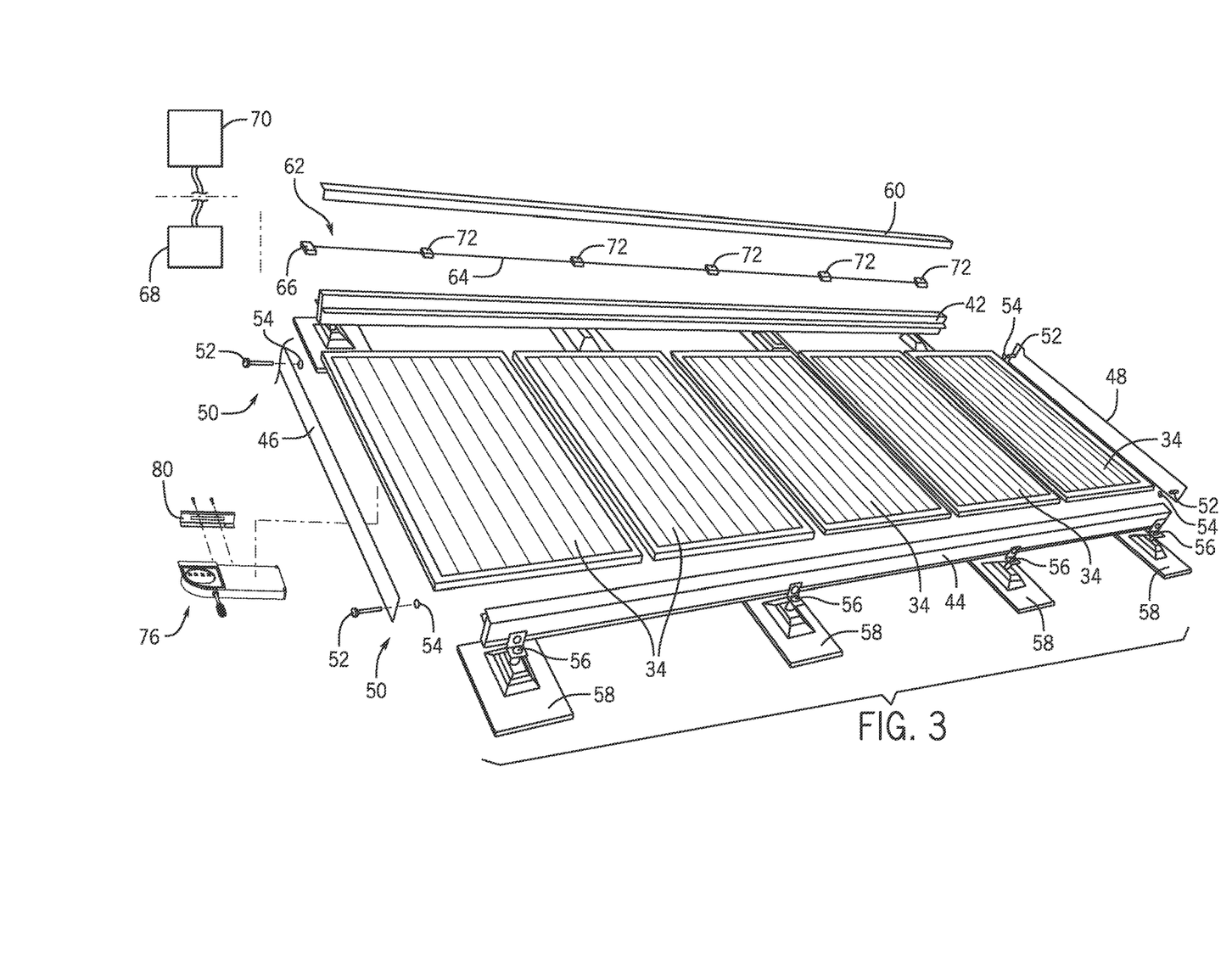
FIG. 3 is an exploded perspective view of a portion of the PV system shown in FIG. 2.

FIG. 2 illustrates a PV system 30 according to an embodiment of the invention. PV system 30 includes a first row 32 containing at least one PV module 34, a second row 36 containing at least one PV module 34, and a rail system 38. FIG. 3 is an exploded perspective view of the second row 36 of PV system 30. Each PV module 34 includes a microinverter assembly 76 and corresponding universal mounting bracket 80, as described in more detail with respect to FIGS. 4-7. It is contemplated that PV system 30 may contain more or less rows of PV modules 34 and more or less PV modules 34 per row in alternative embodiments of the invention.

Referring now to FIGS. 2 and 3 together where appropriate, rail system 38 includes a top rail section 40, a central rail section 42, a bottom rail section 44, a first grounding bar 46, and a second grounding bar 48. As shown in FIG. 2, first and second grounding bars or support bars 46, 48 are positioned in a perpendicular arrangement to rail sections 40, 42, 44. Fastener assemblies 50 mechanically and electrically couple first and second grounding bars 46, 48 to respective ends of rail sections 40, 42, 44, as described in additional detail below. The fastener assemblies 50 include respective pairs of fasteners 52 and star washers 54 that mechanically and electrically couple first and second grounding bars 46, 48 to central rail section 42 and bottom rail section 44 in one embodiment. L-brackets 56 mount rail sections 40, 42, 44 to mounting stanchions 58.

Central rail section 42 includes a rail cover 60, which is secured to central rail section 42 using known fasteners such as, for example, retention clips, and an AC harness 62 positioned within central rail section 42 beneath rail cover 60. AC harness 62 includes a wire assembly 64 electrically coupled to the output of AC PV modules 34 and an end connector 66 coupleable to a connector box 68 for delivery to a load panel 70. A number of AC connectors 72 are positioned at fixed intervals along the length of AC harness 62 to interface with respective AC PV modules 34.

Figure 4:
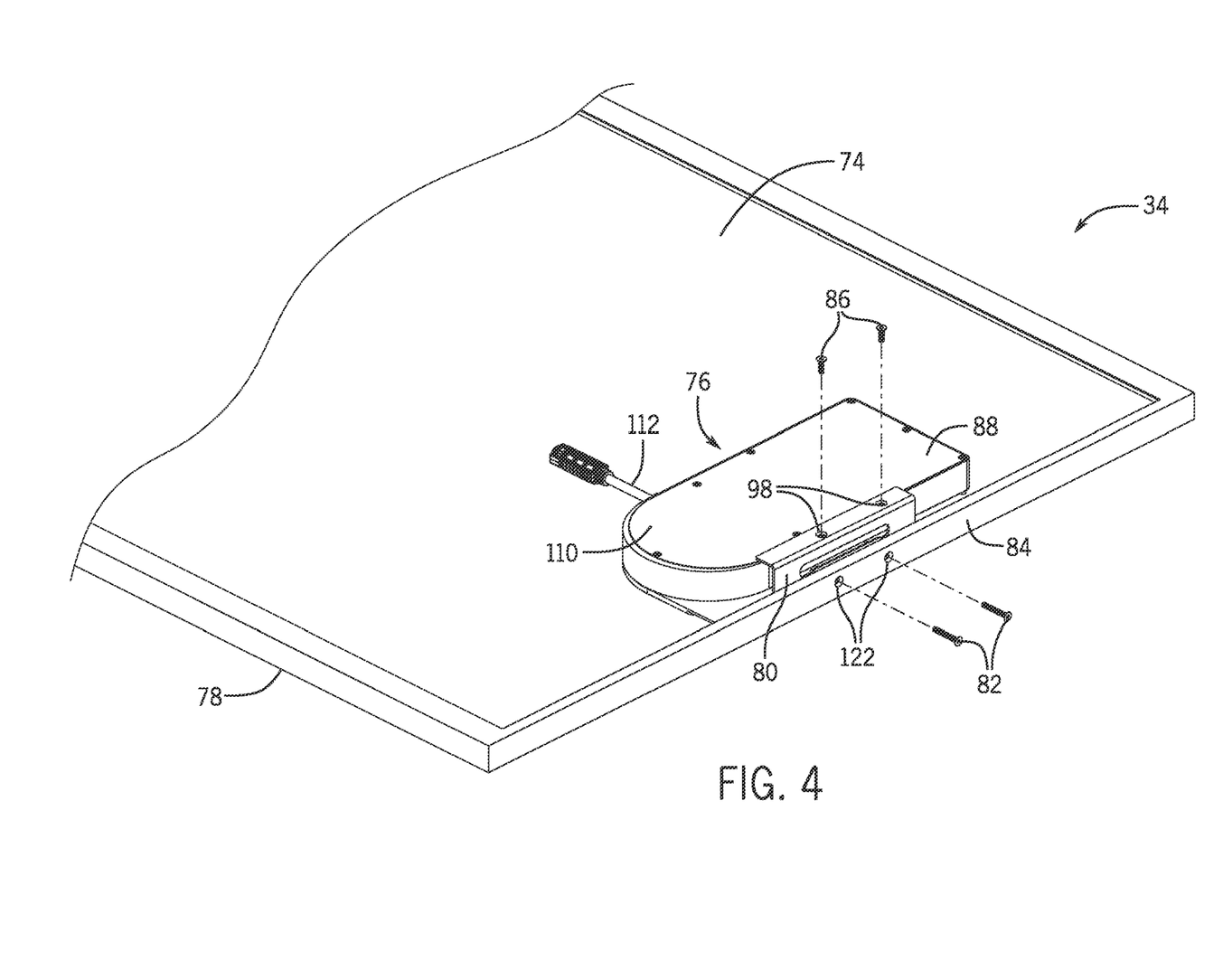
FIG. 4 is a perspective view of the inactive side of a PV module of the PV system of FIG. 2 that incorporates a universal mounting bracket, according to an embodiment of the invention.

FIG. 4 is a perspective view of a portion of the inactive surface 74 of one of the PV modules 34 of the PV system 30 of FIG. 2. PV module 34 includes a microinverter assembly 76 that is coupled to the PV panel 78 via a universal mounting bracket 80. One or more panel fasteners 82 couple the mounting bracket 80 to a frame 84 of the PV panel 78 and one or more microinverter fasteners 86 couple the mounting bracket 80 to a housing 88 of the microinverter assembly 76. In the embodiment shown, two panel fasteners 82 couple the mounting bracket 80 to the frame 84 and two microinverter fasteners 86 are used to couple the mounting bracket 80 to the housing 88. However, more or less fasteners 82, 86 may be used in alternative embodiments based on design specifications.

Figure 5:
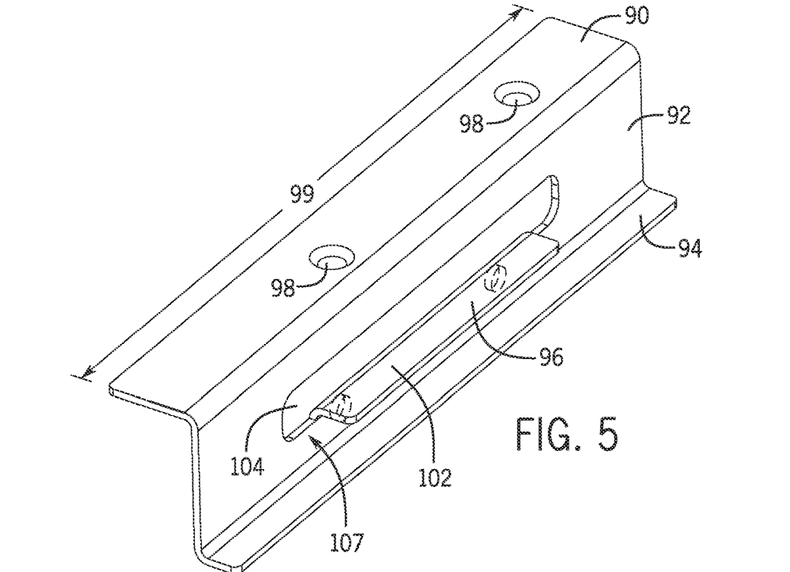
FIG. 5 is a perspective view of the universal mounting bracket of FIG. 4, according to an embodiment of the invention.
Figure 6:
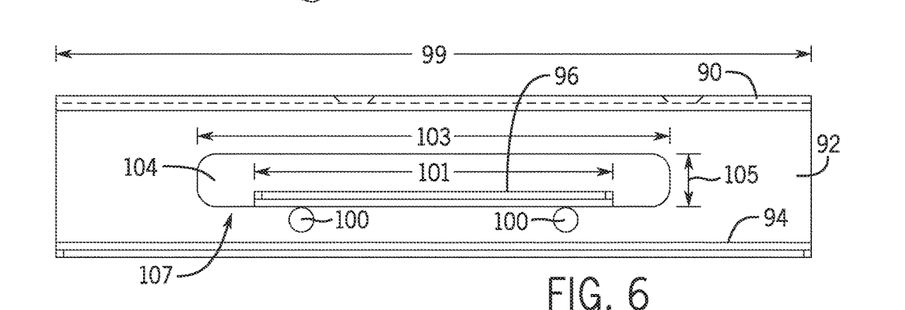
FIG. 6 is a front view of the universal mounting bracket of FIG. 5.
Figure 7:
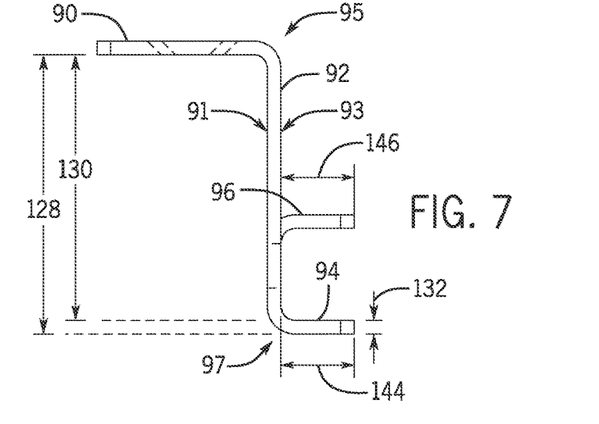
FIG. 7 is a side view of the universal mounting bracket of FIG. 5.

The universal mounting bracket 80 is illustrated in more detail in FIGS. 5-7, with a perspective view of the universal mounting bracket 80 illustrated in FIG. 5 and a front view and a side view of the universal mounting bracket 80 illustrated in FIGS. 6 and 7, respectively. Universal mounting bracket 80 is constructed from a conductive base material such as, for example, metal, and has a weather-resistant surface finish. In one embodiment, the surface coating is an anodized surface coating.

In one embodiment of the invention, the mounting bracket 80 includes a first extension portion 90, a central bracket portion 92, a second extension portion 94, and a third extension portion 96. As shown in FIG. 7, first extension portion 90 extends outward from a top surface 95 of central bracket portion 92 and away from a first surface 91 of central bracket portion 92. Meanwhile, second extension portion 94 extends outward from a bottom surface 97 of central bracket portion 92 and away from a second surface 93 of central bracket portion 92. Third extension portion 96 extends outward from the second surface 93 of central bracket portion 92 at a location above second extension portion 94 and is oriented along a plane that is perpendicular to the plane of central bracket portion 92. As such, the second and third extension portions 94, 96 extend away from central bracket portion 92 in a direction opposite that of first extension portion 90.

In the embodiment shown, first extension portion 90, second extension portion 94, and third extension portions 96 are oriented along planes that are perpendicular to the plane or first surface 91 of central bracket portion 92. However, it is contemplated that any or all of first, second, and third extension portions 90, 94, 96 may be oriented along respective planes at any angle between but not including 0 and 180 degrees with respect to the plane of central bracket portion 92 in alternative embodiments.

First extension portion 90 contains at least one orifice 98 and central bracket portion 92 also contains at least one orifice 100. While FIG. 5 depicts orifices 98 as being non-centered with respect to first extension portion 90, orifices 98 may be located at any positioned along first extension portion 90 in order to align with orifices 120 within housing 88 of microinverter assembly 76. While FIGS. 5-7 show first extension portion 90 having two (2) orifices 98 formed therethrough, it is contemplated that more or less than two (2) orifices 98 may be formed through first extension portion 90. Similarly, while FIGS. 5-7 show central bracket portion 92 having two (2) orifices 100 formed therein, it is contemplated that more or less than two (2) orifices 100 may be formed in central bracket portion 92.

Further, to save on material costs, third extension portion 96 may be formed from material removed from an opening or cutout 102 in central bracket portion 92. In such an embodiment, the material removed from the opening 104 is bent forward from the bottom surface 107 of the opening 104. Third extension portion 96 may be formed from all of the material removed from the opening 104 in the central bracket portion 92 or from a subportion thereof. For example, in the embodiment illustrated in FIG. 6, the width 103 of opening 102 is greater than a width 101 of third extension portion 96 and the height 105 of opening 102 is greater than a length 146 of third extension portion 96. In addition, a width 99 of first extension portion 90, central bracket portion 92, and second extension portion 94 is greater than width 101 of third extension portion 96.

While preferably the mounting bracket 80 is formed from a single piece of material, it is also contemplated that the mounting bracket 80 may be formed by joining a plurality of pieces of material. That is, first extension portion 90, central bracket portion 92, second extension portion 94, and/or third extension portion 96, may be separate pieces of materially joined together such as, for example, via welded connections. In embodiments where third extension portion 96 is provided as a separate piece of material, central bracket portion 92 may or may not include opening 104.

Figure 8A:
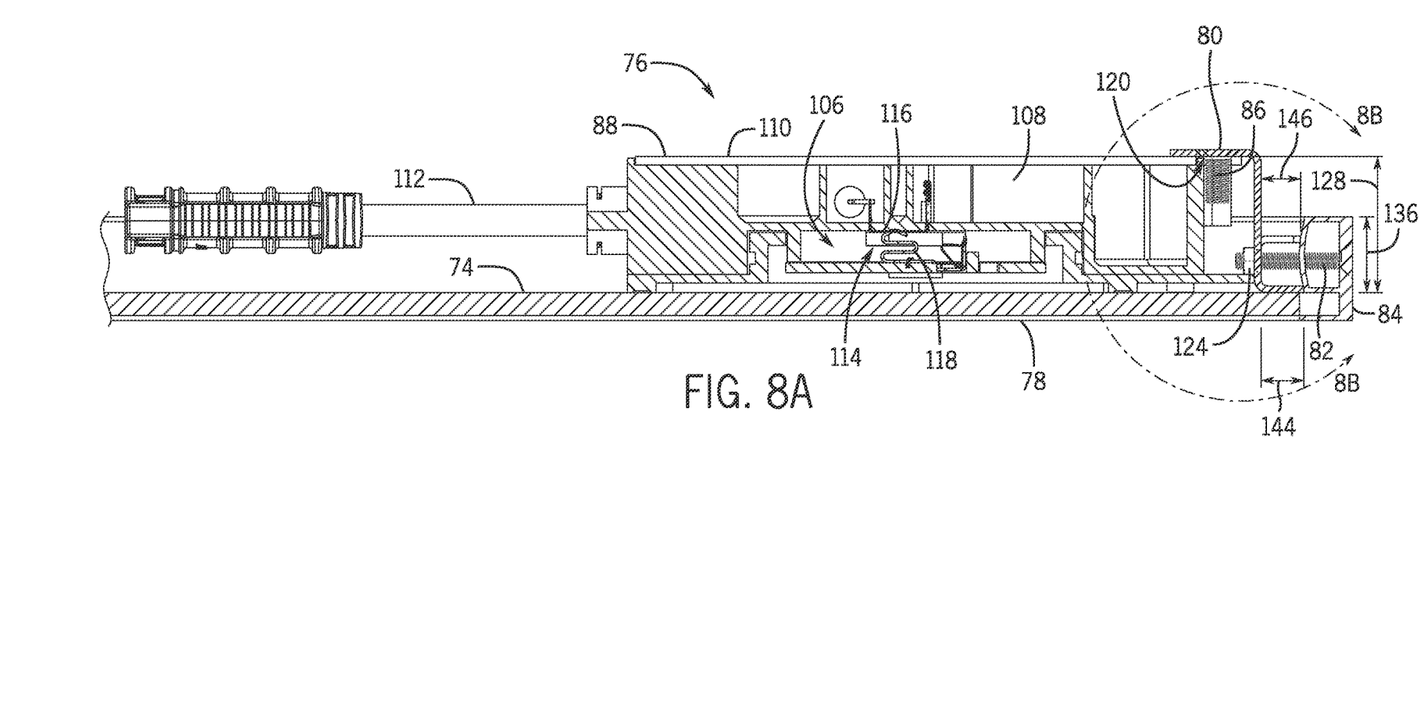
FIG. 8A is a cross-sectional view of the PV module of FIG. 4, according to an embodiment of the invention.
Figure 8B:
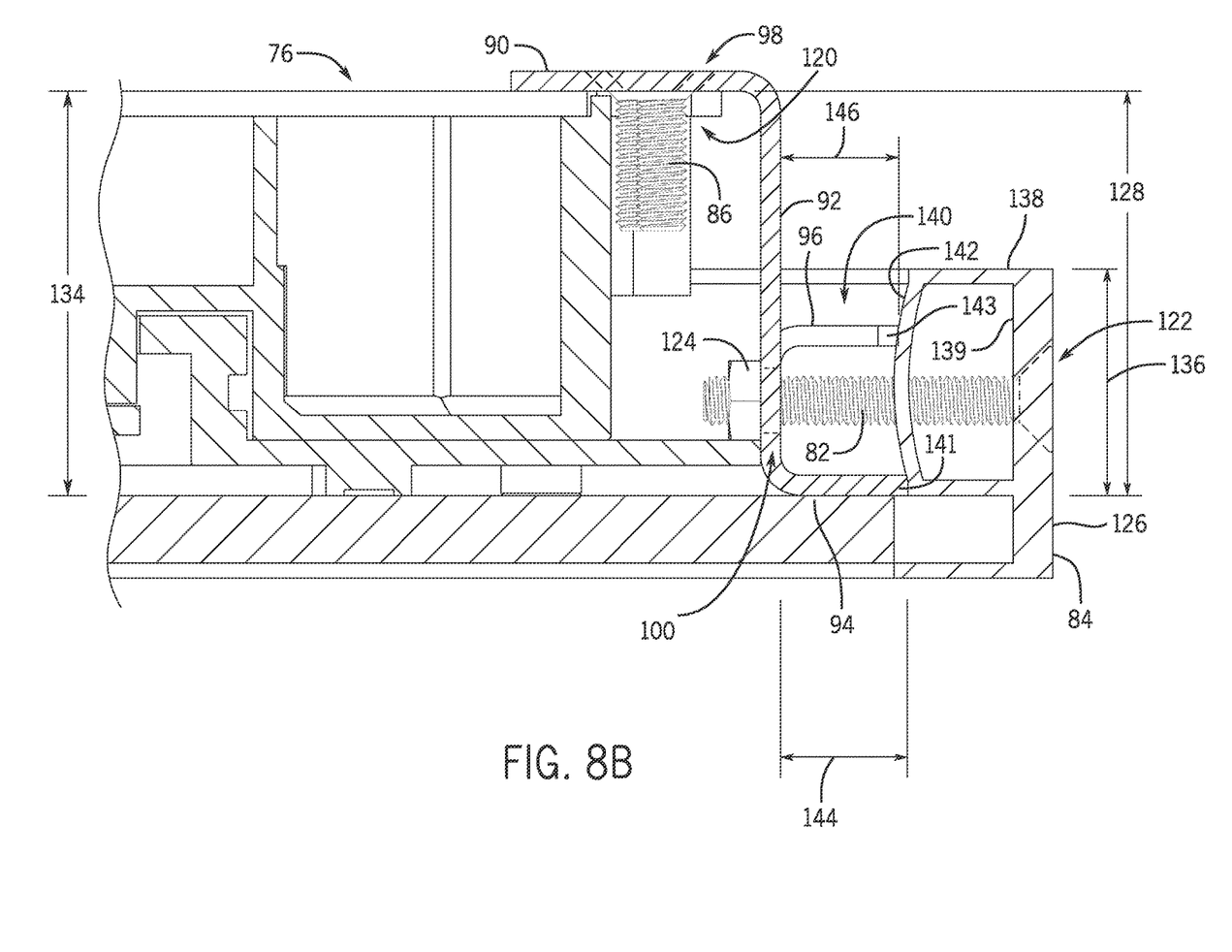
FIG. 8B is an enlarged view of portion 8B of FIG. 8A.

Referring again to FIG. 4, and to FIGS. 8A and 8B as appropriate, further details of the microinverter assembly 76 and the interconnection between the microinverter assembly 76, mounting bracket 80, and PV panel 78 are provided. In one embodiment, microinverter assembly 76 includes a DC connector 106 that is electrically coupled to a microinverter 108 that is configured to convert the DC output generated by PV panel 78 into an AC output. Alternatively, microinverter 108 may be configured to convert the DC output generated by PV panel 78 into a DC output having different voltage and/or current levels. The DC connector 106 and the microinverter 108 are positioned within the microinverter housing 88. Housing 88 includes a top portion 110 that includes an electrically conductive material such as, for example, metal, wherein the remainder of housing 88 may be any suitable material, for example, but not limited to, plastic or metal.

A microinverter wiring harness 112 is electrically coupled to microinverter 106 and extends through housing 88, so as to couple with connectors 72 of FIG. 3. PV module 34 also includes a DC connector 114 that is coupled or bonded to the inactive side 74 of PV panel 78 and is constructed to mate with DC connector 106 of microinverter assembly 76. In an alternative embodiment, it is contemplated that PV module 34 may include a junction box (not shown) that is electrically coupled between the PV panel 78 and the microinverter 108, as opposed to DC connectors 106, 114.

As illustrated in FIG. 8A, microinverter DC connector 106 and panel DC connector 114 include electrical contacts 116, 118, respectively. While FIG. 8A only depicts one (1) electrical contact 116 and one (1) electrical contact 118, it is contemplated that more than one (1) of each electrical contacts 116, 118 may be used to electrically couple microinverter DC connector 106 and panel DC connector 114. Further, while FIG. 8A depicts electrical contacts 116 of microinverter DC connector 106 as flat contacts and electrical contacts 118 of panel DC connector 114 as flexible or spring contacts, electrical contacts 116, 118 may be constructed of various metals and/or various configurations. As one example, electrical contacts 116 may be flexible or spring contacts and electrical contacts 118 may be lead contacts.

Referring now to FIG. 8B in particular, microinverter assembly 76 is coupled to mounting bracket 80 using one or more microinverter fasteners 86 that extend through a corresponding orifice 120 formed through the housing 88 of microinverter assembly 76 and through a corresponding orifice 98 formed in first extension portion 90 of mounting bracket 80. Each microinverter fastener 86 is threadingly engaged with its corresponding orifice 120. Each panel fastener 82 extends through a corresponding orifice 122 formed through the PV panel frame 84 and through a corresponding orifice 100 in the central bracket portion 92 of mounting bracket 80 to couple mounting bracket 80 to PV panel 78. As shown in FIG. 8B, a nut 124 is used to threadingly engage panel fastener 82. In an alternative embodiment, an additional nut may be provided to threadingly engage microinverter fastener 86.

In a preferred embodiment of the invention, orifices 98 of mounting bracket 80 and orifice 122 of panel frame 84 are formed with a countersink feature so that microinverter fasteners 86 and panel fasteners 82 are substantially flush with the first extension portion 90 of mounting bracket 80 and the outer wall 126 of PV panel frame 84, respectively, when installed. However, either or both of orifices 98, 122 may be formed without a countersink feature in alternative embodiments.

In one embodiment the panel fastener 82 and the microinverter fastener 86 create a ground connection between the microinverter assembly 76 and the PV panel frame 84. When orifices 98, 100, 120, 122 are formed, any nonconductive or anodized surface finish of mounting bracket 80, microinverter housing 88, and panel frame 84 is removed to expose the electrically conductive base material underneath. As such, a portion of mounting bracket 80, microinverter housing 88, and panel frame 84 adjacent respective orifices 98, 100, 120, 122 is free of the anodized surface finish. The physical contact between the panel fastener 82, microinverter fastener 86, and base material of the mounting bracket 80, microinverter housing 88, and panel frame 84 electrically ground the PV panel frame 84 to the microinverter housing 88, which is further electrically grounded to the AC ground of PV system 30 through wire harness 112.

As shown in FIGS. 8A and 8B, the combined height 128 of a height 130 of the central bracket portion 92 and a height 132 of the second extension portion 94 of mounting bracket 80 is substantially equal to a height 134 of microinverter assembly 76. In the illustrated invention, the combined height 128 of the central bracket portion 92 and second extension portion 94 of mounting bracket 80 is greater than the height 136 of PV panel frame 84, as is measured as the distance between the inactive surface 74 of the PV panel 78 and the top surface 138 of the PV panel frame 84. However, it is contemplated that mounting bracket 80 may be used with numerous styles of PV panel. As such, height 136 of PV panel frame 84 may be less than, greater than, or equal to the height 128 of mounting bracket 80 in alternative embodiments. Therefore, mounting bracket 80 may be used to mount microinverter assembly 76 to PV panel 78 regardless of height 136 of PV panel frame 84.

As shown in FIG. 8B, the second extension portion 94 of mounting bracket 80 rests atop the inactive surface 74 of PV panel 78. Second and third extension portions 94, 96 of mounting bracket 80 are oriented so as to provide a gap or spacing 140 between central bracket portion 92 of mounting bracket 80 and the inner wall 142 of PV panel frame 84. Second extension portion 94 has a length 144 and third extension portion 96 has a length 146. As such, when an end surface 141 of second extension portion 94 and an end surface 143 of third extension portion 96 are in contact with an inner wall 142 of PV panel frame 84, lengths 144, 146 of second and third extension portions 94, 96 create spacing 140 between central bracket portion 92 and inner wall 142. As a result of spacing 140 between central bracket portion 92 and PV panel frame 84, mounting bracket 80 permits microinverter assembly 76 to be mounted to PV panel frame 84 regardless of the difference in height between the PV panel frame 84 and the microinverter housing 88 and regardless of the geometry of the interior surfaces of the PV panel frame 84.

In addition, second and third extension portions 94, 96 of mounting bracket 80 assist with properly aligning mounting bracket 80 with inner wall 142 of PV panel frame 84. As shown in FIG. 8B, the spacing between second and third extension portions 94, 96 of mounting bracket 80 allows mounting bracket 80 to be properly aligned with PV panel frame 84 regardless of whether the geometry of the inner wall 142 of PV panel frame 84 is curved (as shown in FIG. 8B), angled, or vertical. In one embodiment of the invention, a length 144 of second extension portion 94 is greater than a length 146 of third extension portion 96 in order to accommodate varying geometries of the inner wall 142 of PV panel frame 84. Further, while third extension portion 96 is shown in a generally horizontal orientation in FIG. 8B, third extension portion 96 may be angled upwards or downwards at an angle away from the horizontal orientation in order to accommodate varying geometries of the inner wall 142 of PV panel frame 84. As one non-limiting example, third extension portion 96 may be upwards at a 20 degree angle from horizontal.

While FIG. 8B depicts top surface 138 of panel frame 84 terminating at inner wall 142, length 144 of second extension portion 94 and length 146 of third extension portion 96 are configured to accommodate varying geometries of panel frame 84. As one example, mounting bracket 80 is configured to mount to an alternative panel frame that does not include an inner wall 142. In such a mounting configuration, end surfaces 141, 143 of second and third extension portions 94, 96 would contact the inner surface 139 of the panel frame 84. Therefore, the lengths 144, 146 of second and third extension portions 94, 96, respectively, are selected to be greater than the overhang or width of the top surface 138 of a given panel frame 84.

Beneficially, embodiments of the invention thus provide a microinverter mounting bracket that is configured to secure a microinverter to a PV panel regardless of the physical dimensions of the PV panel frame. That is, the microinverter mounting bracket is able to secure a microinverter to a PV panel regardless of the height of the PV panel frame or the geometry of the interior wall of the PV panel frame.

According to one embodiment of the invention, a PV module includes a PV panel having a frame, a microinverter assembly, and a mounting bracket. The microinverter assembly includes a housing disposed on an inactive surface of the PV panel and a microinverter disposed within the housing. In addition, the mounting bracket includes a central bracket portion oriented along a plane and having at least one orifice formed therethrough, wherein the central bracket portion is coupled to the frame of the PV panel, a first extension portion extending from and oriented perpendicular to the central bracket portion and having at least one orifice formed therethrough, wherein the first extension portion is coupled to the housing of the microinverter assembly, a second extension portion extending from and oriented perpendicular to the central bracket portion, wherein the second extension is positioned on the inactive side of the PV panel, and a third extension portion located above the second extension portion and extending from the central bracket portion, wherein at least one of the second extension portion and the third extension portion is in contact with an inner wall of the frame of the PV panel.

According to another embodiment of the invention, a method of manufacturing a PV module includes providing a microinverter assembly comprising a housing and a microinverter disposed within the housing, electrically coupling the microinverter to a PV panel, and providing a mounting bracket comprising a central bracket portion oriented along a plane and having an orifice formed therethrough, a first extension portion oriented along a plane perpendicular to the plane of the central bracket portion and having an orifice formed therethrough, a second extension portion oriented along a plane perpendicular to the plane of the central bracket portion, and a third extension portion oriented along a plane perpendicular to the plane of the central bracket portion. Further, the method includes positioning the second extension portion in contact with an inactive side of the PV panel, positioning at least one of the second and third extension portions of the mounting bracket in contact with an inner wall of a frame of the PV panel to create a spacing between the central bracket portion of the mounting bracket and the frame of the PV panel, mechanically coupling the first extension portion of the mounting bracket to the microinverter assembly, and mechanically coupling the central bracket portion of the mounting bracket to the frame of the PV panel.

According to yet another embodiment of the invention, a system for securing a microinverter to a PV panel includes a microinverter mounting bracket having a central bracket portion oriented along a plane, the central bracket portion having at least one orifice formed through a thickness defined between a first surface and a second surface of the central bracket portion, a first extension portion extending outward from a top surface of the central bracket portion and away from the first surface of the central bracket portion the first extension portion having at least one orifice formed therethrough, a second extension portion extending outward from a bottom surface of the central bracket portion and away from the second surface of the central bracket portion, and a third extension portion positioned above the second extension portion and extending outward from the second surface of the central bracket portion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A photovoltaic (PV) module comprising:
a PV panel having a frame;
a microinverter assembly comprising:
  a housing disposed on an inactive surface of the PV panel; and
  a microinverter disposed within the housing; and
a mounting bracket comprising:
  a central bracket portion oriented along a plane and having at least one orifice formed therethrough, wherein the central bracket portion is coupled to the frame of the PV panel;

a first extension portion extending from and oriented perpendicular to the central bracket portion and having at least one orifice formed therethrough, wherein the first extension portion is coupled to the housing of the microinverter assembly;

a second extension portion extending from and oriented perpendicular to the central bracket portion, wherein the second extension is positioned on the inactive side of the PV panel; and a third extension portion located above the second extension portion and extending from the central bracket portion;

wherein at least one of the second extension portion and the third extension portion is in contact with an inner wall of the frame of the PV panel.

2. The assembly of claim 1 wherein the first extension portion extends from the central bracket portion in a direction opposite from that of the second and third extension portions.

3. The assembly of claim 1 wherein the third extension portion is formed by orienting a cutout portion of the central bracket portion perpendicular to the central bracket portion.

4. The assembly of claim 1 further comprising:
at least one microinverter fastener extending through the at least one orifice of the first extension portion and at least one orifice formed in the housing to secure the mounting bracket to the microinverter assembly; and
at least one panel fastener extending through the at least one orifice of central bracket portion and at least one orifice formed in the frame of the PV panel to secure the mounting bracket to the frame.

5. The assembly of claim 1 wherein an electrical ground connection is formed between the housing and the PV panel via the mounting bracket, the at least one microinverter fastener, and the at least one panel fastener.

6. The assembly of claim 1 wherein at least one of the second extension portion and the third extension portion is in contact with an inner wall of the frame of the PV panel.

7. A method of manufacturing a photovoltaic (PV) module comprising:
providing a microinverter assembly comprising a housing and a microinverter disposed within the housing;
coupling the microinverter assembly to a PV panel;
providing a mounting bracket comprising a central bracket portion oriented along a plane and having an orifice formed therethrough, a first extension portion oriented along a plane perpendicular to the plane of the central bracket portion and having an orifice formed therethrough, a second extension portion oriented along a plane perpendicular to the plane of the central bracket portion, and a third extension portion oriented along a plane perpendicular to the plane of the central bracket portion;
positioning the second extension portion in contact with an inactive side of the PV panel;
positioning at least one of the second and third extension portions of the mounting bracket in contact with an inner wall of a frame of the PV panel to create a spacing between the central bracket portion of the mounting bracket and the frame of the PV panel;
mechanically coupling the first extension portion of the mounting bracket to the microinverter assembly; and
mechanically coupling the central bracket portion of the mounting bracket to the frame of the PV panel.

8. The method of claim 7 further comprising:
aligning the orifice of the first extension portion with an orifice formed in a top surface of the microinverter assembly; and
inserting a microinverter fastener through the orifice of the first extension portion and the orifice in the top surface of the microinverter assembly.

9. The method of claim 7 further comprising:
aligning the orifice of the central bracket portion with an orifice formed in the frame of the PV panel; and
inserting a panel fastener through the orifice of the central bracket portion and the orifice formed in the frame of the PV panel.

10. The method of claim 7 further comprising:
positioning an end surface of the second extension portion of the mounting bracket in contact with the inner wall of the frame of the PV panel; and
positioning an end surface of the third extension portion of the mounting bracket in contact with the inner wall of the frame of the PV panel.

11. A system for securing a microinverter to a photovoltaic (PV) panel, the system comprising:
a microinverter mounting bracket comprising:
a central bracket portion oriented along a plane, the central bracket portion having at least one orifice formed through a thickness defined between a first surface and a second surface of the central bracket portion;
a first extension portion extending outward from a top surface of the central bracket portion and away from the first surface of the central bracket portion the first extension portion having at least one orifice formed therethrough;
a second extension portion extending outward from a bottom surface of the central bracket portion and away from the second surface of the central bracket portion; and
a third extension portion positioned above the second extension portion and extending outward from the second surface of the central bracket portion.

12. The system of claim 11 further comprising:
a microinverter assembly comprising:
a housing; and
a microinverter disposed within the housing; and
at least one microinverter fastener extending through the at least one orifice of the first extension portion to couple the microinverter mounting bracket to the housing of the microinverter assembly.

13. The system of claim 11 wherein the central bracket portion, the first extension portion, and the second extension portion are of equal width; and
wherein the third extension portion has a width less than the width of the central bracket portion.

14. The system of claim 11 wherein the first extension portion extends outward from the top surface of the central bracket portion in a direction perpendicular to or substantially perpendicular to the first surface of the central bracket portion.

15. The system of claim 11 wherein the second extension portion extends outward from the bottom surface of the central bracket portion in a direction perpendicular to or substantially perpendicular to the first surface of the central bracket portion.

16. The system of claim 11 wherein a combined height of the central bracket portion and the second extension portion of the microinverter mounting bracket is equal to or substantially equal to a height of the microinverter assembly.

17. The system of claim 11 wherein the mounting bracket comprises a conductive base material and an anodized surface finish; and
  wherein a portion of the mounting bracket adjacent the at least one orifice in the first extension portion is free of the anodized surface finish such that the at least one microinverter fastener is in direct contact with the conductive base material of the mounting bracket.

18. The system of claim 11 wherein the third extension portion of the mounting bracket has a length that is equal to or less than a length of the second extension portion of the mounting bracket.

19. The system of claim 11 wherein the third extension portion is oriented perpendicular to the first surface of the central bracket portion.

20. The system of claim 11 wherein an opening is formed in the central bracket portion, the opening having a width greater to or equal to a width of the third extension portion and a height greater to or equal to a length of the third extension portion; and
  wherein the third extension portion extends outward from a bottom surface of the opening.

* * * * *